Figure 1:
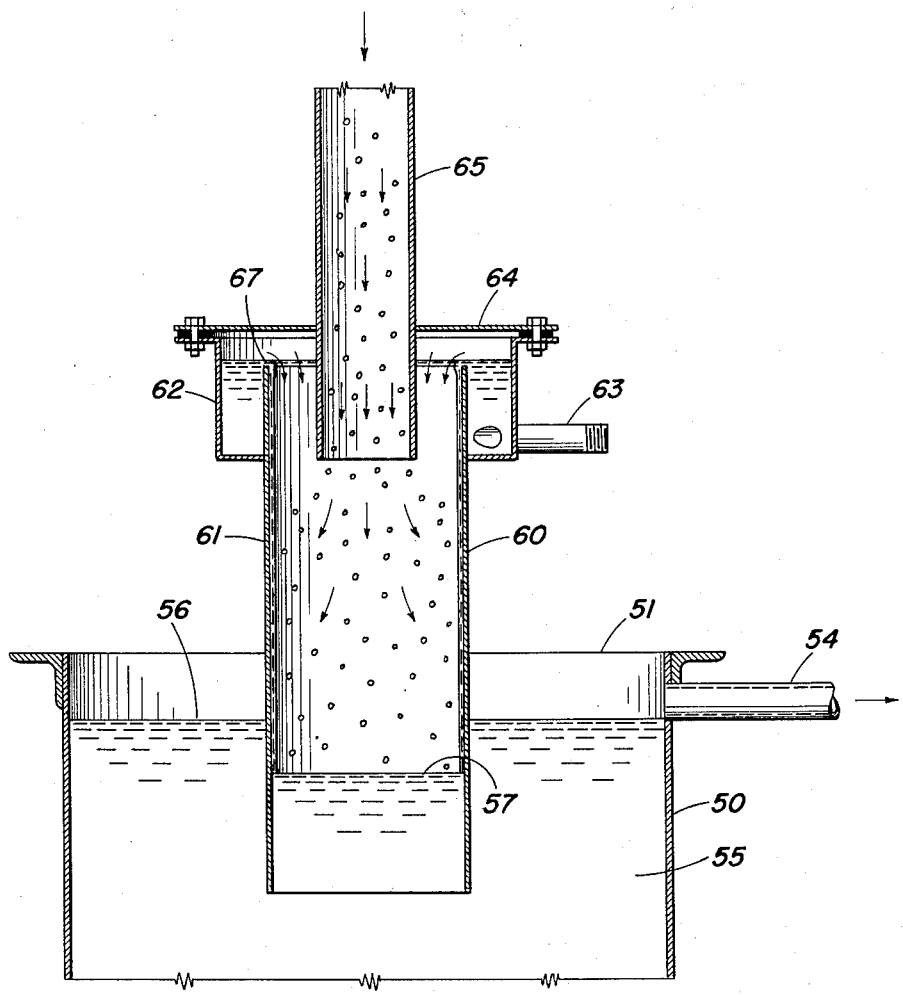

March 13, 1956  E. L. ANDERSON  2,737,960
APPARATUS FOR WETTING FINELY-DIVIDED SOLIDS
Filed Oct. 29, 1952  2 Sheets-Sheet 1

Fig. I.

INVENTOR
Edwin L. Anderson
BY William J. Fox
ATTORNEY

March 13, 1956 E. L. ANDERSON 2,737,960
APPARATUS FOR WETTING FINELY-DIVIDED SOLIDS
Filed Oct. 29, 1952 2 Sheets-Sheet 2

INVENTOR
Edwin L. Anderson
BY William J. Fox
ATTORNEY

United States Patent Office 2,737,960
Patented Mar. 13, 1956

2,737,960

APPARATUS FOR WETTING FINELY-DIVIDED SOLIDS

Edwin L. Anderson, Darien, Conn., assignor to Dorr-Oliver Incorporated, a corporation of Delaware Application October 29, 1952, Serial No. 317,547

3 Claims. (Cl. 134—69)

This invention relates to apparatus for handling finely-divided solids, more particularly for discharging hot or dry solids into a body of liquid whereby the solids are to be wetted or quenched, as by a conduit means leading from a source of solids supply to a point in discharge relationship to a body of liquid into which the solids are to be introduced.

Such apparatus, hereinafter referred to as wetting or quenching apparatus finds advantageous use in operations where hot solids are discharged from furnaces such as fluidized solids reactors and are water quenched prior to further processing or storage. A further illustrative use is in the wetting of fine solids discharged from a dust collector or cyclone where submerged wetting of the solids prevents dust nuisance and also seals against the escape of noxious gases.

In using such apparatus arrangements, an operating problem arises due to the tendency of a quantity of solids to build up into a moist accumulation or deposit on the conduit wall in the region at or above the point of initial solids contact with the liquid. This buildup continues until the conduit is completely plugged thus forcing complete shutdown for clean out.

Even when the solids which are to be admixed with the liquid are readily wetted by the liquid employed, there still exists a problem resulting from the tendency of the solids to form a partially or totally wetted accumulation at or near the zone wherein they become admixed with liquid. That is to say, if a vertical conduit is employed to discharge solids directly into a body of water, the solids particles tend to form a mud ring just above water level. This ring results from the fact that water will rise as a result of capillary action to form an accumulation of solids in the damp zone above water level. The water drawn by capillary action keeps these solids moist so that additional solid particles contacting them adhere to and increase the accumulation with the eventual result that the deposit of damp solids completely chokes off the solids discharge conduit thus necessitatiing a shutdown for clean out.

So it is the principal object of this invention to provide means for continuously and reliably discharging solids into submergence in a body of liquid while discouraging the above defined undesirable build up of solids on the conduit walls.

In order to attain this object, this invention proposes to terminate the main solids supply conduit a distance above the surface of the liquid body, and then to interpose between the lower end of this supply conduit and the liquid body a downwardly open-ended auxiliary wetting or quenching chamber which has its upper end portion in sealed relationship with the lower end portion of the supply conduit. The auxiliary chamber is provided with liquid supply means for continuously supplying to the inner faces of the chamber a smooth and continuous downwardly flowing film of liquid.

Significantly, the auxiliary wetting chamber is so disposed with respect to the lower end portion of the solids-supply conduit that the liquid-film covered surfaces extend a distance above the lower terminal edge of the supply conduit. In this manner there is established a vertical overlapping region between the lower end portion of the solids-supply conduit and the upper end portion of the auxiliary chamber which surrounds said lower end portion of the supply conduit in spaced relationship therewith. In this quenching apparatus the solids-supply conduit remains dry at all times whereas the inner faces of the auxiliary chamber are at all times wetted with an everchanging film of liquid. Thus, incoming solids either fall directly into the main liquid body or impinge upon the wetted walls to be washed into the main liquid body. In no case, however, can there be undesirable accumulation of moist solids because there is no damp area suitable for such accumulation. That is to say, no solids build-up can occur on the walls of the supply conduit because that conduit remains dry at all times. And no build-up can occur on the walls of the auxiliary chamber because they are completely wetted by an everchanging liquid film which immediately washes impinging solids downwardly into the main liquid body. In short, the solids can contact either completely dry areas or thoroughly wetted areas, but cannot contact a merely damp area because such an area does not exist.

It is essential that the liquid film flowing down the inner walls of the auxiliary chamber be a flow covering the entire surface of the walls. This is to prevent the occurrence of damp areas on the chamber walls. It is also important that the liquid flow be a smooth, non-splashing flow because it is essential that stray drops of water do not reach the supply conduit to create damp areas there. Both of these requirements are readily met by providing a tangential liquid inlet to the launder so that overflow down the chamber walls is evenly distributed.

In somewhat more detail, this invention provides quenching apparatus which comprises an auxiliary wetting chamber in combination with and interposed between a dry solids supply conduit and a main liquid body; in such combination, the auxiliary wetting chamber comprises a length of open-ended tubular section which may have its lower end portion immersed in the liquid body and has its upper end portion surrounding the lower end portion of the solids supply conduit in spaced and overlapping relationship therewith, an annular trough surrounding the region of the overlap and in sealed relationship with both the supply conduit and the outer side walls of the tubular section, and supply means for introducing liquid into the trough to overflow the upper edge of the tubular section and form a downwardly flowing film of liquid on its inner walls.

Construction of the apparatus may be of any suitable material, due regard being had to the temperature and corrosive nature of the solids and wetting liquid to be handled. For instance, dry limestone would not require special materials whereas hot roasted pyrite calcine at a temperature near 1000° C. would require heat resistant materials.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims, or of forms that are their functional as well as conjointly cooperative equivalents, are therefore intended to be embraced by those claims.

In Figure 1 there is shown a cut-away view illustrating the essential details of this invention in association with a quench tank wherein solids are delivered into submergence in the liquid body. More specifically, in Figure 1, there is shown a tank 50 having a cover 51, which is optional, a liquid-solids suspension overflow conduit 54, the tank contains a body of liquid 55. Tank details not shown include suitable agitation means and a clean out valve both of which are normally located near the tank bottom.

Leading into the top of the tank is an auxiliary wetting chamber 60, which comprises tubular member 61, annular launder 62, tangentially disposed liquid inlet 63 and sealing cover plate 64. Solids supply conduit 65 enters the top of auxiliary chamber 60 in such a manner that it is spaced inside and in overlapping relationship with the upper end portion of tubular member 61.

In operation, liquid is continuously supplied tangentially to launder 62 via conduit 63 to overflow over edge 67 and form a downwardly flowing liquid film on the inner faces of member 61. Dry solids enter through conduit 65 and either fall directly into liquid body 55 or impinge against the walls of member 61 where they are washed down into the main body by the liquid film.

The smoothly flowing film minimizes splashing and prevents liquid from reaching solids supply conduit 65 to form damp areas thereon upon which solids can accumulate. The smooth liquid flow also serves a second function in that it prevents the accumulation of solids at or near the point of entry of the solids into the liquid by continuously washing the walls free of solids. In short, the quenching apparatus has eliminated damp areas and provides apparatus wherein the transition from dry solids to wetted or quenched solids is accomplished without danger of undesirable solids accumulation.

Liquid body 55 has a normal level 56 which may be equal, less than, or more than liquid level 57 of chamber 60 depending upon the pressure exerted through conduit 65.

Figure 2:
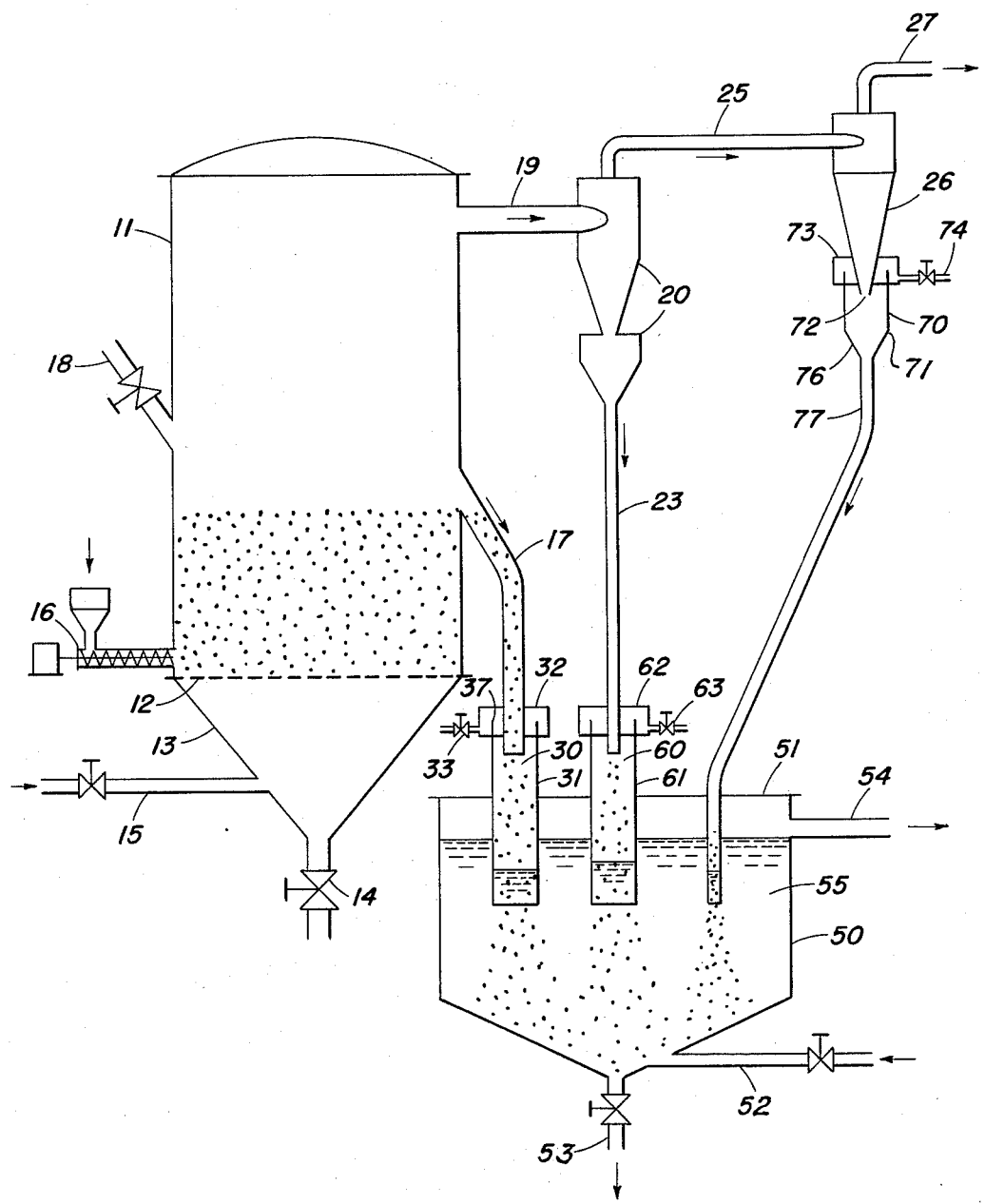

Figure 2 is a schematic view illustrating my quenching apparatus in comibnation with a fluidized solids furnace and its dust collecting system.

In Figure 2 there is shown a fluidized solids reactor 11 such as is commonly employed to roast pyrite or calcine lime and the like, having a gas permeable constriction plate 12, a coned bottom 13 which serves as a windbox and is equipped with a clean out valve 14 as well as a fluidizing gas inlet conduit 15. Solids are supplied to the reactor via feed device 16 and are discharged therefrom via overflow conduit 17. Conduit 18 may be used to admit solids or gases, or may be equipped with a heating torch. Gases containing entrained solids leave the reactor via conduit 19 to enter dust collector 20 from which separated solids are discharged via conduit 23 while the gases pass via conduit 25 to further dust collector 26. Clean gas is finally discharged from the system via conduit 27 while separated solids are discharged directly into auxiliary quenching chamber 30 the operation of which will be more fully described hereinafter.

For receiving and quenching solids discharged from the reactor and dust collectors there is provided a quench tank 50 having a cover 51 which is optional, agitating air inlet 52, a clean out valve 53 and a liquid-solids suspension outlet 54.

Solids leaving reactor 11 pass downwardly through conduit 17 to enter auxiliary quench chamber 30 thence into tank 50 and finally are discharged via outlet 54. Auxiliary quench chamber 30 comprises tubular member 31 which has its lower end portion submerged in liquid body 55 while its upper end portion overlaps and surrounds lower end portion of conduit 17. Annular launder 32 surrounds member 31 at its upper end portion. Valved conduit 33 is provided for tangentially introducing liquid to launder 32 to overflow over edge 37 thence down the inner walls of member 31.

Solids leaving dust collector 20 pass down conduit 23 to enter auxiliary quenching chamber 60 which comprises tubular member 61, launder 62 and liquid inlet 63. Operation of this chamber is the same as that previously described for chamber 30.

A modification of the invention is shown in combination with dust collector 26 of Figure 2. Solids discharge directly from collector 26 into auxiliary chamber 70. Auxiliary chamber 70 comprises member 71 the upper end portion of which surrounds solids discharge opening 72 and is in spaced relationship therewith. Launder 73 and valved inlet conduit 74 provide the flow of liquid down the inner walls of member 71. Member 71 terminates in an inverted coned section 76 which in turn is secured to conduit 77 that leads to a point in submergence in liquid body 55.

Solids discharge from outlet 72 and fall or are washed into the entrance to conduit 77 where they are wetted to form a liquid-solids suspension which flows readily down conduit 77 into tank 50. This arrangement makes possible the use of a single quench tank for handling solids discharged from several sources because it permits the inclined flow of solids rather than requiring vertical or only slightly inclined conduits. This is particularly useful where several cyclones are employed in series or series parallel to remove solids from a single gas stream.

In the system of Figure 2 there are shown different liquid levels in members 31 and 61 and conduit 77. This is due to a difference in pressures in the various sources of solids. Also, the system of Figure 2 show tops for sealing the quenching apparatus thus preventing dust losses and the escape of gases. It is not essential in all cases that the device be air tight, but this choice will depend upon the nature of the job as to pressures, dusting, etc.

I claim:

1. Apparatus for discharging finely-divided solids into a liquid body as by a conduit leading from a source of solids supply to a point in discharge relationship to a liquid body as defined by its liquid level, which comprises said supply conduit terminating a distance above the liquid level, an auxiliary wetting chamber functionally interposed between said supply conduit and said liquid body said auxiliary chamber comprising a substantially vertical open-ended tubular section the lower end portion of which terminates at an elevation below the upper level of the liquid body and the upper end portion of which surrounds the lower end portion of said supply conduit in spaced and vertically overlapping relationship therewith, an annular trough-shaped liquid supply chamber formed upon and surrounding the upper end portion of said tubular section whereby liquid from said annular chamber is adapted to overflow inwardly across the top edge of said tubular section, and supply means for introducing liquid into said annular chamber whereby said overflowing liquid is adapted to provide a continuous film of liquid upon the inner face of said tubular section.

2. Apparatus according to claim 1, in which the upper end of the outer wall of said annular trough-shaped chamber has sealed relationship with said solids-supply conduit.

3. Apparatus for discharging finely-divided solids into a liquid body as by a conduit leading from a source of solids supply to a point in discharge relationship to a liquid body as defined by its liquid level, which comprises said supply conduit terminating a distance above the liquid level, an auxiliary wetting chamber functionally interposed between said supply conduit and said liquid body said auxiliary chamber comprising a substantially vertical open-ended tubular section the lower end portion of which terminates at an elevation below the upper level of the liquid body and the upper end portion of which surrounds the lower end portion of said supply conduit in spaced and vertically overlapping relationship therewith, an annular trough-shaped liquid supply chamber formed upon and surrounding the upper end portion of said tubular section and having the upper end of its outer wall in sealed relationship with the outer wall of said solids supply conduit whereby liquid from said annular chamber is adapted to overflow inwardly across the top edge of said tubular section, and supply means tangentially entering the outer wall of said annular chamber for tangentially introducing liquid thereinto whereby said overflowing liquid is adapted to provide a continuous film of liquid upon the inner face of said tubular section.

References Cited in the file of this patent

UNITED STATES PATENTS

| | | |
|---|---|---|
| 2,159,352 | Chapman | May 23, 1939 |
| 2,379,824 | Mummery | July 3, 1945 |
| 2,630,376 | Dunn | Mar. 3, 1953 |
| 2,638,424 | Hansgirg | May 12, 1953 |

FOREIGN PATENTS

| | | |
|---|---|---|
| 616,100 | Great Britain | Jan. 17, 1949 |